United States Patent
Tzamaloukas et al.

(10) Patent No.: US 8,612,437 B2
(45) Date of Patent: Dec. 17, 2013

(54) SYSTEM AND METHOD FOR LOCATION-BASED SEARCHES AND ADVERTISING

(75) Inventors: Assimakis Tzamaloukas, San Jose, CA (US); Robert Currie, Los Gatos, CA (US); Charles E Gotlieb, San Francisco, CA (US)

(73) Assignee: BlackBerry Limited, Waterloo (CA)

( * ) Notice: Subject to any disclaimer, the term of this patent is extended or adjusted under 35 U.S.C. 154(b) by 398 days.

(21) Appl. No.: 11/511,688

(22) Filed: Aug. 28, 2006

(65) Prior Publication Data

US 2008/0052276 A1 Feb. 28, 2008

(51) Int. Cl.
G06F 7/00 (2006.01)
G06F 17/30 (2006.01)
G06F 13/00 (2006.01)

(52) U.S. Cl.
USPC .................. 707/736; 707/706; 711/118

(58) Field of Classification Search
None
See application file for complete search history.

(56) References Cited

U.S. PATENT DOCUMENTS

| | | | |
|---|---|---|---|
| 5,491,694 A | 2/1996 | Oliver et al. | |
| 5,682,525 A | 10/1997 | Bouve et al. | |
| 5,845,262 A | 12/1998 | Nozue et al. | |
| 6,185,737 B1 | 2/2001 | Northcutt et al. | |
| 6,324,184 B1 | 11/2001 | Hou et al. | |
| 6,483,870 B1 | 11/2002 | Locklear et al. | |
| 6,912,575 B1 | 6/2005 | Swift et al. | |
| 6,944,166 B1 | 9/2005 | Perinpanathan et al. | |
| 6,975,963 B2 | 12/2005 | Hamilton et al. | |
| 7,039,441 B1 | 5/2006 | Reudink et al. | |
| 7,193,966 B2 | 3/2007 | Gupta et al. | |
| 7,299,284 B2 | 11/2007 | McKinnon et al. | |
| 7,440,762 B2 | 10/2008 | Maloney et al. | |
| 7,499,453 B2 | 3/2009 | Carlson et al. | |
| 7,987,260 B2 * | 7/2011 | Rogers et al. | 709/224 |
| 8,112,522 B2 * | 2/2012 | Rogers et al. | 709/224 |
| 8,280,395 B2 * | 10/2012 | Tzamaloukas et al. | 455/453 |
| 8,307,090 B2 * | 11/2012 | Rogers et al. | 709/226 |
| 2001/0056577 A1 * | 12/2001 | Gordon et al. | 725/52 |
| 2002/0044526 A1 | 4/2002 | Rijhsinghani et al. | |
| 2002/0046264 A1 | 4/2002 | Dillon et al. | |
| 2003/0036848 A1 * | 2/2003 | Sheha et al. | 701/209 |
| 2003/0191853 A1 | 10/2003 | Ono | |
| 2003/0232625 A1 | 12/2003 | Bhushan et al. | |
| 2004/0098325 A1 | 5/2004 | Shibasaki | |
| 2004/0103159 A1 | 5/2004 | Williamson et al. | |
| 2004/0136408 A1 | 7/2004 | Tomobe et al. | |
| 2004/0139106 A1 | 7/2004 | Bachman et al. | |
| 2004/0221032 A1 | 11/2004 | Bernstein et al. | |

(Continued)

OTHER PUBLICATIONS

Final Rejection mailed Mar. 3, 2011, in corresponding U.S. Appl. No. 11/511,752.

(Continued)

*Primary Examiner* — Rehana Perveen
*Assistant Examiner* — Huen Wong
(74) *Attorney, Agent, or Firm* — Novak Druce Connolly Bove + Quigg LLP

(57) ABSTRACT

A system and method provides location-aware search results from a navigation or other device and provides one or more enhanced listings or advertisements with the results to offset the communication cost of the search. The sponsor may be charged for the listing or advertisement and the charge may be based on whether the device arrives in an area around the sponsor location within a threshold amount of time.

21 Claims, 4 Drawing Sheets

(56) References Cited

U.S. PATENT DOCUMENTS

| | | |
|---|---|---|
| 2004/0230370 A1* | 11/2004 | Tzamaloukas ............... 701/200 |
| 2004/0230373 A1* | 11/2004 | Tzamaloukas ............... 701/208 |
| 2004/0235527 A1 | 11/2004 | Reudink et al. |
| 2004/0243488 A1 | 12/2004 | Yamamoto et al. |
| 2004/0249799 A1* | 12/2004 | Demarcken et al. ............ 707/3 |
| 2005/0027705 A1* | 2/2005 | Sadri et al. ................... 707/5 |
| 2005/0165615 A1* | 7/2005 | Minar ............................ 705/1 |
| 2005/0227739 A1 | 10/2005 | Dowling et al. |
| 2005/0243755 A1 | 11/2005 | Stephens |
| 2005/0272413 A1 | 12/2005 | Bourne |
| 2005/0288856 A1 | 12/2005 | Uyeki et al. |
| 2005/0289140 A1* | 12/2005 | Ford et al. ..................... 707/5 |
| 2006/0026019 A1 | 2/2006 | Sethi et al. |
| 2006/0026147 A1* | 2/2006 | Cone et al. ..................... 707/3 |
| 2006/0026213 A1 | 2/2006 | Yaskin et al. |
| 2006/0112081 A1* | 5/2006 | Qureshi .......................... 707/3 |
| 2006/0123014 A1* | 6/2006 | Ng ................................ 707/100 |
| 2006/0218115 A1 | 9/2006 | Goodman et al. |
| 2006/0259474 A1 | 11/2006 | Granito |
| 2006/0265377 A1* | 11/2006 | Raman et al. ................... 707/9 |
| 2006/0271281 A1* | 11/2006 | Ahn et al. ..................... 701/208 |
| 2006/0271438 A1* | 11/2006 | Shotland et al. ............... 705/14 |
| 2006/0277460 A1 | 12/2006 | Forstall et al. |
| 2007/0005584 A1* | 1/2007 | Feng et al. ..................... 707/4 |
| 2007/0060099 A1 | 3/2007 | Ramer et al. |
| 2007/0061245 A1* | 3/2007 | Ramer et al. ................... 705/37 |
| 2007/0061363 A1* | 3/2007 | Ramer et al. ............... 707/104.1 |
| 2007/0078848 A1* | 4/2007 | Sareen et al. ................... 707/5 |
| 2007/0078851 A1* | 4/2007 | Grell et al. ..................... 707/7 |
| 2007/0081543 A1 | 4/2007 | Brenes et al. |
| 2007/0100652 A1* | 5/2007 | Ramer et al. ................... 705/1 |
| 2007/0156807 A1 | 7/2007 | Ma et al. |
| 2007/0174246 A1 | 7/2007 | Sigurdsson et al. |
| 2007/0174260 A1 | 7/2007 | Bachman et al. |
| 2007/0185768 A1* | 8/2007 | Vengroff et al. ............... 705/14 |
| 2007/0219708 A1* | 9/2007 | Brasche et al. ............... 701/207 |
| 2007/0219715 A1 | 9/2007 | Uyeki et al. |
| 2007/0244636 A1 | 10/2007 | Horikami |
| 2008/0005156 A1 | 1/2008 | Edwards et al. |
| 2008/0005342 A1 | 1/2008 | Schneider |
| 2008/0010262 A1 | 1/2008 | Frank |
| 2008/0010273 A1 | 1/2008 | Frank |
| 2008/0010605 A1 | 1/2008 | Frank |
| 2008/0021879 A1 | 1/2008 | Cheng |
| 2008/0052206 A1 | 2/2008 | Edwards et al. |
| 2008/0052391 A1 | 2/2008 | Rogers et al. |
| 2008/0201065 A1 | 8/2008 | Zerod |
| 2009/0103559 A1 | 4/2009 | Pickering et al. |
| 2009/0182959 A1 | 7/2009 | Rao |
| 2009/0234815 A1* | 9/2009 | Boerries et al. ................. 707/3 |
| 2010/0085887 A1 | 4/2010 | Ray et al. |

OTHER PUBLICATIONS

Non-Final Office Action mailed Sep. 21, 2010, in corresponding U.S. Appl. No. 11/511,752.

Notice of Allowance and Fee(s) Due mailed May 15, 2012, in corresponding U.S. Appl. No. 11/511,752.

Non-Final Office Action mailed May 13, 2009, in corresponding U.S. Appl. No. 11/511,752.

Final Rejection mailed Jul. 19, 2012, in corresponding U.S. Appl. No. 11/511,946.

Non-Final Office Action mailed Jan. 5, 2012, in corresponding U.S. Appl. No. 11/511,946.

Non-Final Office Action mailed Mar. 5, 2009, in corresponding U.S. Appl. No. 11/511,946.

Non-Final Office Action mailed Aug. 21, 2008, in corresponding U.S. Appl. No. 11/511,946.

* cited by examiner

SYSTEM AND METHOD FOR LOCATION-BASED SEARCHES AND ADVERTISING

RELATED APPLICATIONS

This application is related to application Ser. No. 11/511,752, entitled, "System and Method for Updating Information Using Limited Bandwidth", filed on Aug. 28, 2006 by Assimakis Tzamaloukas and Seth Rogers, and application Ser. No. 11/511,946, entitled, "System and Method for Location-Based Searches and Advertising" filed on Aug. 28, 2006 by Robert Currie, Assimakis Tzamaloukas and Charles Gotlieb, each having the same assignee as the present application and each is hereby incorporated by reference in its entirety.

FIELD OF THE INVENTION

The present invention is related to computer software and more specifically to computer software for global positioning-based devices.

BACKGROUND OF THE INVENTION

Conventional navigation devices can provide a limited amount of searching based on databases resident in the device and knowledge of the device's location. For example, a user can enter "gas stations" and see gas stations that are located nearby because the device has a database of gas stations and the navigation system contains a conventional global positioning system receiver.

If the user of a device wishes to perform a search based on terms that are not stored in the database in the device, the user is unable to use the navigation device for that search. The user can use a conventional laptop computer system to perform a search, for example using a conventional cellular telephone data communications capability, but many users may not wish to pay the extra cost of doing so. Conventional navigation systems manufacturers are reluctant to build such a capability into their navigation systems, because they do not want to absorb the communication costs, and their customers would be reluctant to pay extra for such a capability.

One problem with building such a capability into a device is the fact that a user is required to either focus on the search and not the road, or pull over and perform the search.

What is needed is a system and method that can supply location-based search results from information external to a navigation device without requiring a user or a supplier to pay for all of the communication charges to support the search, and need not require the user to perform each an every search.

SUMMARY OF INVENTION

A system and method receives a search term from a user at a location-aware device, such as a device that can determine its location using a global positioning system. The device combines the search term with the location to form a request, and provides the request to the server. The server maintains a cache of search results for search terms, for example, resulting from prior requests it has received, and if the search results in the cache correspond to the location in the request, and are acceptably recent, the server assembles the search results relevant to the location. If relevant results for the location in the request are not in the server's cache, the server forwards the request to one or more web sites that support location based searching, consolidates the results in its cache, and assembles the results relevant to the location.

The server then identifies whether a sponsor corresponds to the request. A sponsor corresponds to the request if it is named in the results, or if the sponsor has purchased the right to correspond to the search term and/or location corresponding to the request. Information corresponding to the sponsor may be used to supplement the results assembled and the results assembled and so supplemented are provided to the device for display to the user. If a sponsor corresponds to the request, a sponsor listing appearing in the results may be highlighted or otherwise modified, for example, by displaying the results corresponding to the sponsor at the top of the results. The results assembled, supplemented as described above, and thus modified are provided to the device for display to the user by the device. Location information, for example, an address, is listed in each entry in the results, sufficient to allow the user to request and receive from the device driving directions to an entry or a sponsor location, estimated travel times to an entry or a sponsor location, a map of an area in which an entry or the sponsor's location is located, or other location-based information for an entry or a sponsor location. The user may request additional actions to be performed, such as obtaining restaurant or theater reservations, and the system and method complies with the request, optionally providing the estimated time of arrival to the entity to whom the request is made based on the location of the device being used to make the request. The user or sponsor may pay for such fulfillment of the request. In exchange for being listed or an enhanced listing, the sponsor may pay a fee that can be used, at least on part, to defray the costs of communication of the search request and its results. The search results may include RSS feeds or other information to which a user of the device that sent the search request has subscribed.

The system and method can monitor the location of the device used to perform the search. In one embodiment, the sponsor only pays, or pays for the provision of the sponsor information and then also may pay an enhanced charge, if the user drives to the location supplied as part of the sponsor information.

In one embodiment, the system and method can automatically perform the same search or searches over and over as the user changes locations, thus, freeing the user from repeatedly entering common search terms at different locations.

BRIEF DESCRIPTION OF THE DRAWINGS

FIG. 4 is a block schematic diagram of the server of. FIG. 1B for performing a location-based search according to one embodiment of the present invention.

DETAILED DESCRIPTION OF A PREFERRED EMBODIMENT

Figure 1A:
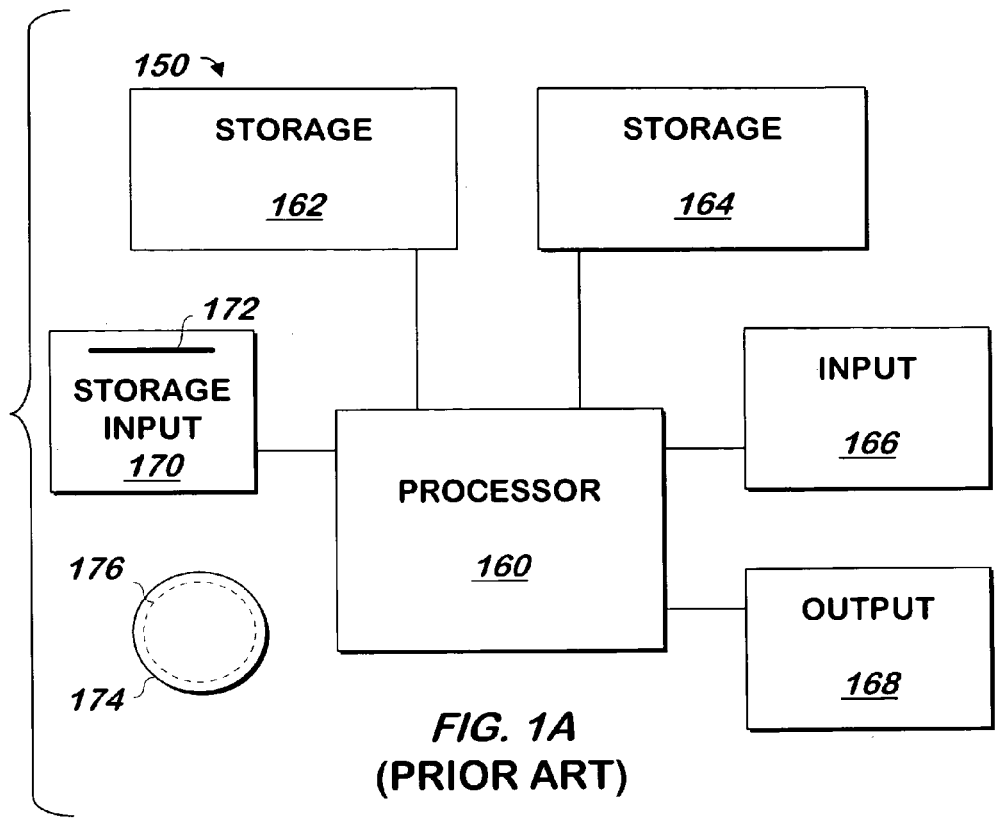
FIG. 1A is a block schematic diagram of a conventional computer system.

The present invention may be implemented as computer software on a conventional computer system. Referring now to FIG. 1A, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is part of an embedded system and includes an ARM processor and related components commercially available from ARM, such as the conventional XScale family of components available from Marvell Technology Group, or any other embedded system components running in a device. Other embodiments of computer systems include a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 1B:
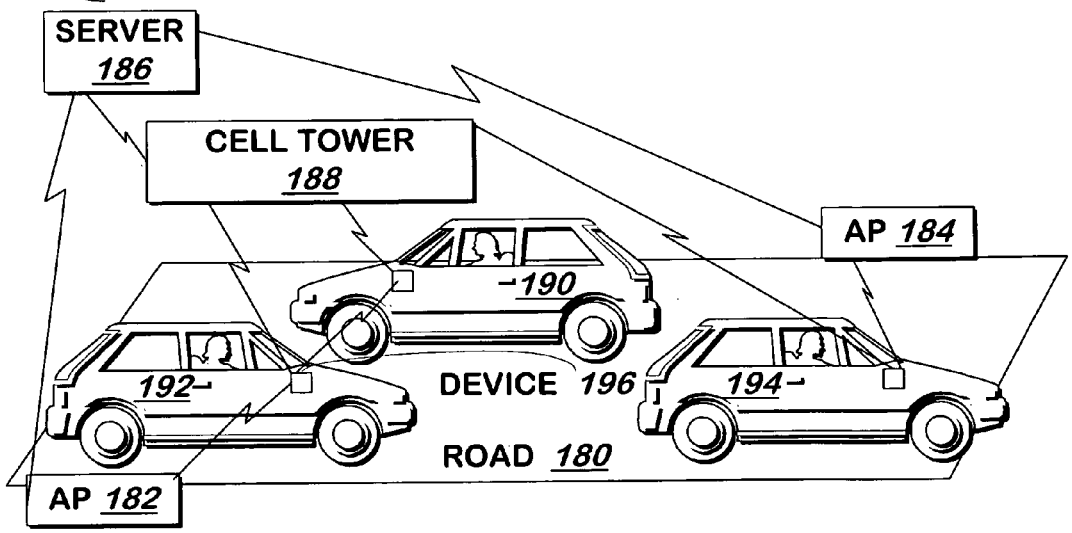
FIG. 1B is a diagram of a road, with three automobiles that can communicate with each other or a server, either via a cellular connection or a wireless access point.

The present invention may be used in any environment, a representative one of which will now be described. Referring now to FIG. 1B, a conventional road with wireless access points being driven on by conventional automobiles is shown according to one embodiment of the present invention. Automobiles 190, 192, 194 drive on road 180, which contains roadside wireless access points 182, 184, which in turn include conventional wireless access points running any of the conventional 802.11x protocols. Some or all of automobiles 190, 192, 194 have a device such as device 196 containing a conventional wireless radio (not shown) for communicating with access points 182, 184 and the radios of other automobiles 190, 192, 194. Device 196 may include a conventional GPS receiver for use as described herein. Additionally, device 196 contains a conventional cellular telephone communications subsystem (not shown) for communication with conventional cellular telephone tower 188 containing conventional cellular telephone radio equipment operating in a conventional manner. Cell tower 188 communicates with server 186, which is a conventional computer system as described above. This allows communication between device 196 and server 186. As noted, other automobiles 190, 194 also contain devices similar or identical to device 196.

Although the present invention is described with respect to automobiles, the present invention may be used in any vehicle, such as a boat, plane, bicycle or other moving object.

Wireless access points 182, 184 are coupled to a conventional network such as the Internet, Ethernet or both, and the network is coupled to server 186, which may include one or more conventional servers. Three automobiles 190, 192, 194 and two wireless access points 182, 184 are shown in one embodiment of the present invention, though other numbers of these items may be used.

Radios in automobiles 190, 192, 194 may communicate with access points 182, 184 via conventional wireless networking techniques or with radios in other automobiles 190, 192, 194 via an ad-hoc mode of network communication.

Figure 2A:
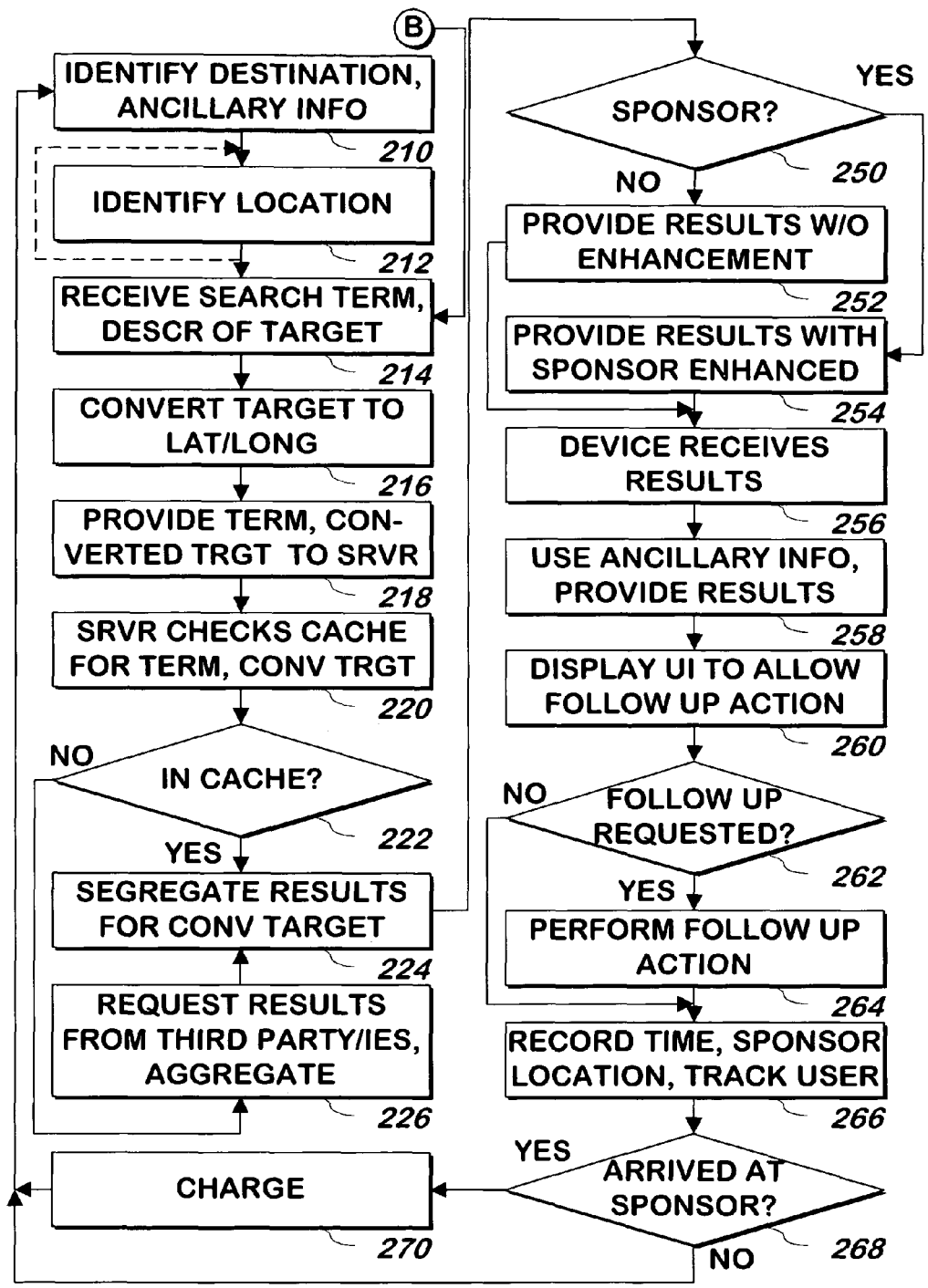
FIG. 2A is a flowchart illustrating a method of performing a location-based search according to one embodiment of the present invention.

Referring now to FIG. 2A, a method of providing information about locations is shown according to one embodiment of the present invention. A destination of a user, and/or ancillary information about the user is optionally identified 210. In one embodiment, the destination is identified via a conventional user interface that provides driving directions when an address or other location is specified. Ancillary information may include other information, such as schedules, contacts, and other information about a user, not having to do with a map or directions.

A location of a device the user is using is optionally identified 212. In one embodiment, the location is identified periodically as part of an independently running process as shown by the dashed line in the Figure. In one embodiment, the location is identified using a conventional global positioning system that identifies latitude and longitude of a device. In one embodiment, step 212, 210, both or neither is used.

A search term, and a description of a target location (referred to herein as the "target") is received 214. In one embodiment, the search term is any single or multiple words corresponding to terms of interest, such as "restaurants", "Costco", or "gas stations". In one embodiment, the description of a target includes an indication of the location associated with the target, which may be the current location; or alternatively may be a destination such as those identified in steps 210 or 212; or as a third alternative may be a different location, which may be specified by an address, intersection, ZIP code, city, state, county, or country as part of step 214.

The target may be optionally converted to latitude and longitude 216. For example, the latitude and longitude of a city may be the center of the city, or a landmark of the city such as the City Hall. The search term received in step 214 and the target or converted target identified in step 214 and/or 216 is provided to a server 218 as part of a request for information about the search term that is relevant to the target or converted target specified. In one embodiment, these items are provided to a server via a wireless or cellular telephone connection.

When the server receives the term and target or converted target, the server checks a cache of terms corresponding to search results that it maintains 220. The server may check its cache for an exact match with the term, or for a synonym match with the term, for example, matching gas stations to the term "service station", "filling station" and the like, as well as with misspellings such as "filing station". Step 220 may include identifying whether or not the results that the server has cached include any results at or nearby the target or converted target provided in step 218. If the term (or a corresponding term), and corresponding results at or near the target or converted target, are in the cache 222, the server selects the results corresponding to the term most relevant to the target or converted target 224. The server may maintain in the cache multiple results for each term for locations other than the target or converted target specified, and so the server in step 224 limits the results of the search to those relevant to the target or converted target, such as those within a threshold distance of the target or converted target. The method continues at step 250.

If, however, the term (or a corresponding term), or results corresponding to the target or converted target, are not in the server's cache 222, the server requests 226 results for the search term from one or more third parties. The request may be made, and results received, using a conventional API to web sites that supply such APIs.

Companies that supply such APIs include Microsoft (MSN Search API: at the website of msdn.microsoft.com/library/default.asp?urL=/library/en-us/MSN_Search_Web_Service_SDK/HTML/MSNSearchWebServiceClassLibrary.asp and Windows Live Expo Beta API: at the website of msdn.microsoft.com/library/default.asp?url=/library/en-us/dnlive/html/winliveexpo.asp?frame=true&hidetoc=true); Google (at the web site of: google.com/apis/maps/documentation/#Routing_Local_Etc); and Yahoo (Yahoo Local Search APIs: at the web site of developer.yahoo.com/search/local/). The request may be made, and results received, by scraping the results of an http: search request made to a web site, such as those provided by AOL.com, A9.com or ask.com. Each of the third parties may be operated by an entity that is independent of the other entities, and independent of the entity operating the server. If the server requests search results from multiple parties, the server may aggregate the results 226, for example by eliminating duplicate results, or by placing the results from the different parties into a consistent format based on the party from which the results were obtained, and knowledge of the format of the results provided by that party. The method continues at step 224.

The data in the cache may correspond to business and residential information, such as names and addresses, such as may be found in a yellow and white pages telephone directory. Additional information, such as a classification of business, store hours and the like, may be included. The cache may be populated with data from the external servers or it may be populated with data supplied by another party, such as by using commercially available databases, for example, directory listings from yellow pages and the like.

In one embodiment, the server stores information received from RSS feeds, with one or more feeds being associated on the server with one or more devices. The ancillary information received in step 210 may include the RSS feeds, or RSS feeds and relevant text terms, and the server will associate with the device from which it was received, the feed or information from the feed that corresponds to the relevant text terms. This allows a user to arrange the RSS feeds that suits that user's tastes: and the RSS feed will be associated on the server with that user's device or devices. A single feed may be associated with multiple users, or with multiple users that have requested the same information from the feed, or information from a feed may be stored for a single user. In one embodiment, the search performed by the server will include not only information about local businesses and the like, but also the information from RSS feeds associated with the device from which the search request was received, to the extent that the information is relevant to the search: both the one or more terms as well as the target location.

It isn't necessary that the server cache be in a single location or even be operated by the same entity. The server cache can extend to multiple locations and entities. For example, the RSS feeds can reside at the servers of each entity that supplies the feed, with the server searching those entities as needed.

In one embodiment, each result received or maintained by the server contains information that includes a location corresponding to that result. In one embodiment, the server additionally maintains information about one or more sponsors who have paid a fee for the sponsorship. The information about each sponsor may include the name of the sponsor, to allow it to be identified if it appears in the results, and/or information about the search terms and/or target or converted target to which the sponsor corresponds. If the terms or results correspond to the sponsor 250, because the name of the sponsor is included in the results, or because the term, location, or both corresponds to the sponsor, information about the sponsor may be added to the results obtained in step 224 to be provided to the device. Additionally, if the sponsor is listed as one of the results, the results may be provided to the device in a manner that enhances the position or display of the sponsor's result 254, such as by displaying the sponsor first, or a highlighting the display of the sponsor's result, and the method continues at step 256. If no sponsor corresponds to the results 250, the results are provided without change or enhancement of sponsor information 252 and the method continues at step 256.

The device receives the results 256 as provided in step 252 or 254. The ancillary information received in step 210 may be used to display 258 the results or to perform other functions. For example, ancillary information may include schedule information that indicates that the user of the device is meeting a friend at the ballpark. The ancillary. .information may be used to identify in the results a restaurant frequented by that friend whose name is specified in the ancillary information. To display the results using the ancillary information, the results may be marked with an indication that the friend being met frequents any result so identified. Even if the search is not for restaurants, the results can include names of restaurants nearby a ballpark that are frequented by that friend, with an indication that the friend prefers such restaurants. To provide such results, the name of the friend and purpose of the meeting may be provided to the server in a separate search or as part of the terms provided in step 218 above, and the server uses information it maintains about each person and their preferences to identify results, with results corresponding to the ancillary information being provided with the results of the search requested as described above. Alternatively, only sponsor information may be provided using such ancillary information.

In another embodiment, ancillary information is not used, and the results received in step 200 are provided by the device without such additions 258.

In one embodiment, a user interface is provided 260 to allow the user of the device to specify a follow-up action to be performed based on the search results or independently thereof. In one embodiment, a follow up action may include making a reservation at a restaurant corresponding to the results, obtaining movie theater tickets from a theater corresponding to the results, or other actions related to the results. If such a follow-up action is requested 262, a follow up action is performed 264, and the method continues at step 266. Otherwise 262, the method continues at step 266. In one embodiment, performing a follow up action includes providing the user's name and credit card information to a theater or an agent thereof, or providing the user's name and telephone number to a restaurant or an agent thereof for a reservation.

The theater or restaurant may be the sponsor or one of the sponsors, although it may be another result. In one embodiment, the travel time to the restaurant may be used to identify the time of the reservation, such travel time being available to the device as described in the related application. Briefly, the travel times are provided using deviations to expected travel times for road segments corresponding to a conventional map database. The expected times are stored in a database in the device, with periodic updates being received to identify current conditions that deviate from those specified in the database as described in the related application. The device uses conventional map route algorithms to identify the route from the current location of the device to the location of any selected search result or sponsor and then identifies travel times by summing the travel times received as described above of each of the segments corresponding to the route.

In one embodiment, the time and location corresponding to sponsors of search results are recorded, and the user is tracked 266 to identify whether the user arrives at any location corresponding to a sponsor that was provided in the display of the step 258. If the user arrives at the location of the sponsor 268 within a threshold amount of time (such as 8 hours) of the time the sponsor was displayed as part of the search results as described above, the sponsor may be charged a fee 270 or may be charged a higher fee than was charged for including the enhanced display of the sponsor information in step 252. Thus, users corresponding to devices that have arrived at a sponsor's location within a threshold period of time generate a fee from the sponsor, or generate a higher fee from the sponsor than is paid if the user does not arrive at a location corresponding to a sponsor. The method continues at step 210. It is noted that the user may be tracked to determine if the user arrived at the sponsor as part of a separate, independently running process, and so step 210 can follow step 264. If the user does not arrive at the location corresponding to the sponsor 268, the method continues at step 210.

Figure 2B:
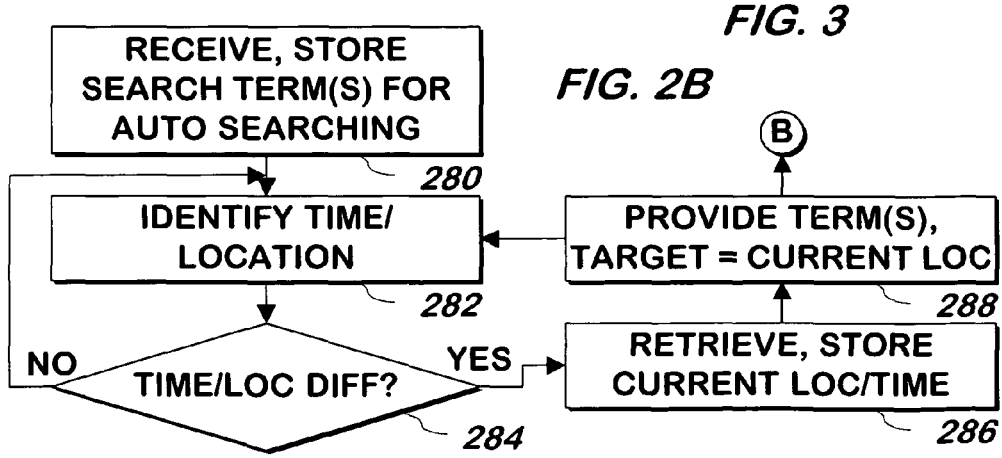
FIG. 2B is a flowchart illustrating a method of performing automatic location-based searches according to one embodiment of the present invention.

In one embodiment, the method of FIG. 2A may be used to perform automatic searches. In one embodiment, a user of the device may select or provide one or more search terms that will be repeatedly submitted as described above as the device operates. The search is repeatedly performed and the results are displayed to allow the user to view the results of those searches without having to manually perform the searches. Referring now to FIG. 2B, a method of performing automatic searches is shown according to one embodiment of the present invention. One or more search terms are received 280, either using text, or selection of predefined terms such as "gas station", "coffee shop", etc., or both text and selection may be employed. The search terms can employ multiple items, such as "'coffee shop' or 'gas station'", or multiple sets of search terms may be received individually. The search terms are received in step 280 as part of an automatic search registration process and may be updated at any time. The search terms are stored as part of step 280.

The current date and time, location or both are identified 282, for example using GPS signals from a GPS receiver as described above. If the date and time, location, or both are different 284 by at least a threshold amount or time, distance or both, from a date and time, location or both that were retrieved in a previous iteration of step 286, described below, the method continues at step 286 and otherwise, the method continues at step 282. In one embodiment, step 282 includes waiting for a period of time to elapse before identifying the date and time and location. At step 286, the date and time, location or both are retrieved in a manner similar to that of step 282, and the date and time, location or both are stored. The search term or terms received in step 280 are provided 288 with an indication to use the current location as the target location in a search, to the method of step 2A, for example at step 214 and the method continues at step 282. Different sets of search terms can be provided as separate searches one at a time, or the different sets can be provided as a single search with an "or" operator added between each set of terms. Thus, the method of FIGS. 2A and 2B can operate simultaneously, as separate, independently running processes, with FIG. 2A initiated by FIG. 2B or by a user. As the user moves about in a car or walking or otherwise, the display will update with search results that may not have appeared before, due to the user's changed location.

Figure 3:
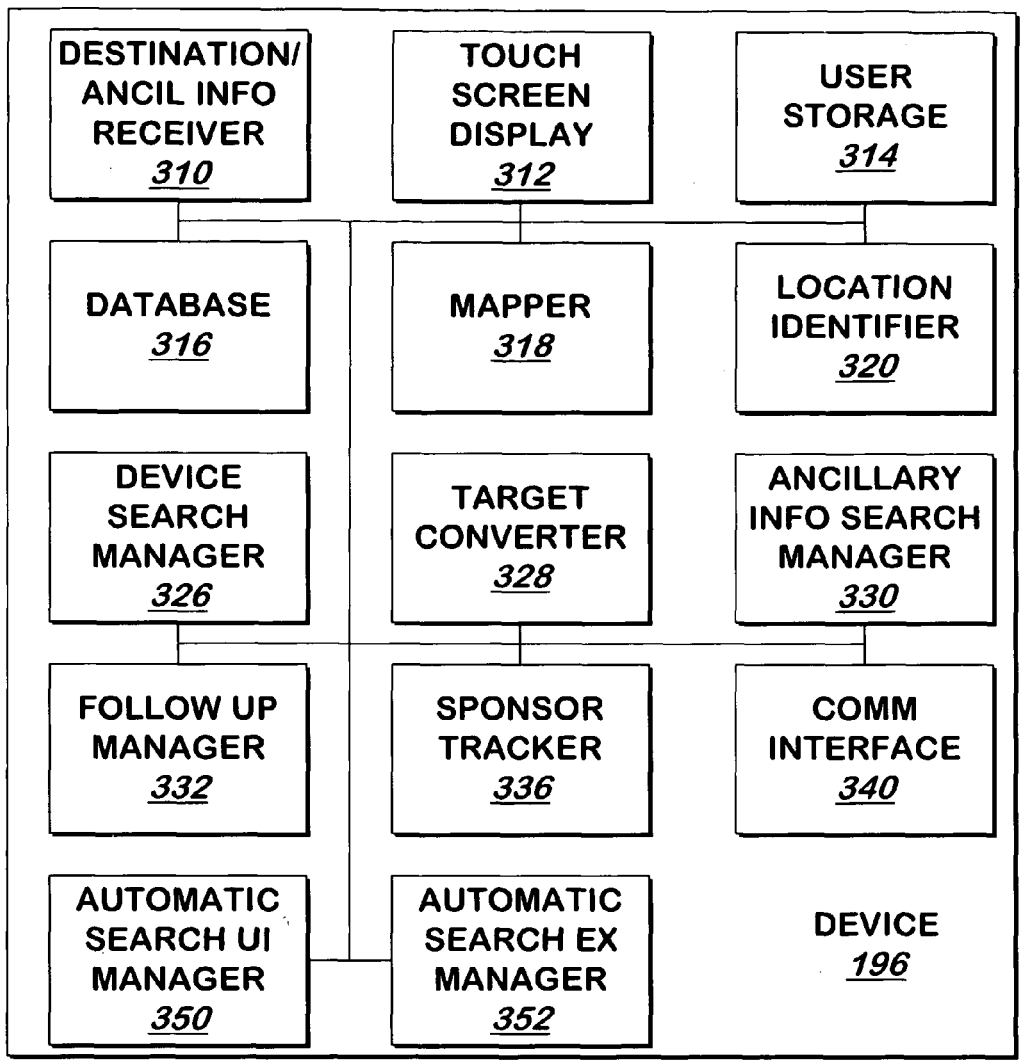
FIG. 3 is a block schematic diagram of the device of FIG. 1B for performing a location-based search according to one embodiment of the present invention.
Figure 4:
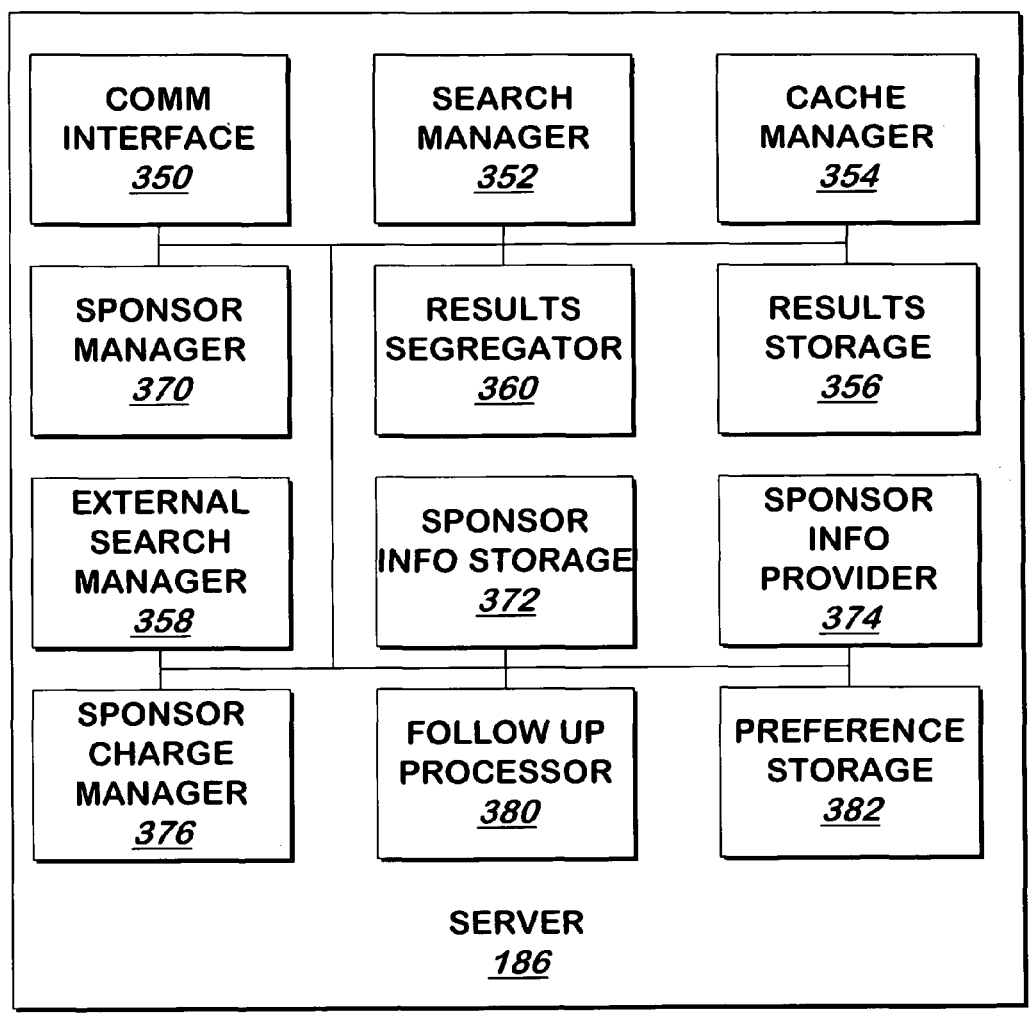

FIGS. 3 and 4 illustrate a system of providing information about locations according to one embodiment of the present invention. FIG. 3 is an illustration of device 196 of FIG. 1B shown in more detail according to one embodiment of the present invention. Referring now to FIG. 3, at any time, a user (not shown) may provide a destination to destination/ancillary information receiver 310 via touch screen display 312. In one embodiment, touch screen display 312 is a conventional LCD display screen comprising a touch sensor. In one embodiment, to provide the destination and/or ancillary information, the user pushes a "destination" button on touch screen display 312 and touch screen display 312 then signals destination/ancillary information receiver 310. When so signaled, destination/ancillary information receiver 310 provides a user interface for entering a destination, such as a street address, to the user via touch screen display 312. In one embodiment, the destination may also be entered in other forms, such as in the form of an intersection, ZIP code, city, state, county, country, or landmark. When destination/ancillary information receiver 310 receives a destination from the user via touch screen display 312, destination/ancillary information receiver 310 provides the destination to target converter 328.

When target converter 328 receives a destination from destination/ancillary information receiver 310, target converter 328 converts the destination to latitude and longitude coordinates. To perform the conversion, target converter 328 compares the destination received to data stored in database 316 using conventional geocoding techniques. In one embodiment, database 316 includes conventional databases that contain geographic data such as map images; records of address ranges along road segments; and latitude and longitude coordinates corresponding to defined destinations such as addresses, ZIP codes, cities, states, counties, countries, and landmarks. Database 316 also includes a travel time database, which stores the travel times required to traverse each road segment in each direction at varying times of day for different types of days as described above. In one embodiment, database 316 further includes an update database containing the latest update as described in related application Ser. No. 11/511,752 and used as described below. When target converter 328 has converted the destination to latitude and longitude coordinates, target converter 328 stores the converted destination in user storage 314, overwriting any previously stored destination.

Additionally, target converter 328 provides the converted target to mapper 318, and mapper 318 uses the information in database 316 to generate a map of a route from the current location to the destination. To do so, mapper 318 first signals location identifier 320. In one embodiment, location identifier 320 includes a conventional GPS system. When location identifier 320 receives a signal from mapper 318, location identifier 320 determines the latitude and longitude coordinates of the current location, along with the current time, and provides them to mapper 318.

When mapper 318 receives the current location and time from location identifier 320, mapper 318 uses the information stored in database 316 and conventional routing techniques to determine the "best" route between the current location and the converted destination. In one embodiment, the best route is determined to be the one that will take the least time to traverse, or the one which is most composed of major roads. To determine the time required to traverse each route, mapper 318 uses the travel time database and the update database in database 316 to determine the travel time for each segment. As described in the related application, in one embodiment, the update database contains differences expressed as percentages from the time database; for example, a value of 200 percent stored associated with a road segment would indicate that current driving conditions are such that twice as much time is required to traverse that road segment than is usually required at that time of day. Mapper 318 determines the time required to traverse each road segment of the route using the percentages stored in the update database as applied to the normal times stored in the travel time database. If no data on a road segment of the route is stored in the update database, mapper 318 uses the data for that road segment at the current time in the travel time database. Mapper 318 sums the times required to traverse each road segment of the route in order to find the total time required to traverse that route. When mapper 318 has determined the best route between the current location and the converted destination, mapper 318 generates a map of that route using the map images stored in database 316 and provides the map to touch screen display 312 for display to the user.

At any time, a user may indicate a desire to perform a search, for example by pushing a "search" button on touch screen display 312. When touch screen display 312 receives such a search indication from the user, touch screen display 312 signals device search manager 326, and device search manager 326 provides a user interface via touch screen display 312, which prompts the user to select a target of the search. In one embodiment, the user may select the current location, the current destination, or another location as the target of the search.

If the user selects the current location, device search manager 326 signals location identifier 320, which determines the latitude and longitude coordinates of the current location and provides them to device search manager 326. Device search manager 326 determines that these coordinates are the converted target.

If the user selects the current destination, device search manager 326 retrieves the converted destination stored in user storage 314. In one embodiment, device search manager 326 may display the destination to the user for confirmation, for example by retrieving a map image corresponding to the latitude and longitude coordinates of the converted destination from database 316 and displaying it to the user. If the user indicates that the destination is correct, or in the embodiment that a confirmation step is not used, device search manager 326 determines that the retrieved destination is the converted target.

If the user indicates that the stored destination is no longer correct, or if the user selects another location as the target of the search, device search manager 326 provides a user interface for the user to enter a target, such as a street address, intersection, ZIP code, city, state, county, country or landmark. When device search manager 326 receives a target from the user, device search manager 326 provides the target to target converter 328, which converts the target to latitude and longitude coordinates using the information in database 316 as described above. Target converter 328 provides the converted target to device search manager 326.

When device search manager 326 has received or determined the converted target as described above, device search manager 326 provides a user interface via touch screen display to allow the user to enter a search term. As described above, in one embodiment the search term is any single or multiple words corresponding to terms of interest, such as "restaurants", "Costco", or "gas stations". Device search manager 326 builds a search record that includes the search term and the converted target, and provides the search record to server 186 of FIG. 4 via communication interface 340. In one embodiment, communication interface 340 is a conventional network interface such as a TCP/IP-capable communication interface, which may include a conventional wireless modem capable of transmitting and receiving information across a network such as the Internet, a cellular telephone network, or both.

FIG. 4 is an illustration of server 186 of FIG. 1B shown in more detail according to one embodiment of the present invention. Referring now to FIG. 4, when server 186 receives the search record, the record is received by communication interface 350 of server 186. Like communication interface 340 described above, in one embodiment communication interface 350 is a conventional network interface such as a TCP/IP-capable communication interface, which may include a conventional device such as a modem or router capable of transmitting and receiving information across a network such as the Internet, a cellular telephone network, or both. When communication interface 350 receives the search record, communication interface 350 provides the record to server search manager 352. In one embodiment server 186 communicates with device 196 via cell tower 188, which is a conventional cellular telephone tower that can route data communications via the Internet.

When server search manager 352 receives the search record, server search manager provides the search record to cache manager 354 and also retains the search record for use as described below. Cache manager 354 checks results storage 356 to see if the results of any similar search are already stored. In one embodiment, results storage 356 includes a conventional database. In one embodiment, two searches are "similar" if a) the targets of the searches are located near to each other, such as within the same metropolitan area, and b) the terms of the searches are the same or consist of synonyms. In one embodiment, cache manager 354 internally stores a list of common search terms and their synonyms, as well as a list of areas, including the latitude and longitude coordinates that form the boundaries of these areas, and cache manager 354 uses these lists to determine both the area in which the target is located and whether the search term matches a search or its synonyms in results storage 356. In this embodiment, search results are stored in cache manager 354 in separate tables for each area, and when checking for prior search results cache manager 354 checks the table corresponding to the area in which the target is contained for both the term of the search record and any known synonyms to that term. In other embodiments, cache manager 354 may use other techniques to determine whether the targets of the searches are located near to each other and/or whether the terms of the searches are synonymous. If cache manager 354 finds a result record for a similar search stored in results storage 356, cache manager 354 provides that result record to server search manager 352. The result record contains the results of the corresponding search for the area as described in more detail below. Otherwise, cache manager 354 provides the search record, along with any known synonyms for the search term, to external search manager 358.

When external search manager 358 receives the search record and any synonyms from server search manager 352, external search manager 358 requests results for the search term and converted target, and results for each synonym along with the same target, from one or more third parties via communication interface 350. External search manager 358 may request results for the search using a conventional API, a web service, and/or by scraping the results of one or more http: search requests made to one or more web sites.

External search manager 358 creates a result record based on the results received from the one or more third parties. In one embodiment, each result includes a name, address, and latitude/longitude coordinates. For example, if the search was for "gas station" and the target was the latitude and longitude coordinates corresponding to "Fifth and Market", the results might include "Shell Gas Station, 1070 Market" along with the latitude/longitude coordinates corresponding to that address. Because each result may be returned in a different format based on the party from which the results were obtained, in one embodiment external search manager 358 extracts names, addresses, and coordinates from each result, based on the party from which the results were obtained and knowledge of the format of the results provided by that party. To create the result record, external search manager includes the name, address, and latitude/longitude of each result corresponding to the search term and converted target, as well as the name, address, and latitude/longitude of results corresponding to each known synonym for the term as well as the same target. If two or more results for a search term or synonym have the same name, address, and latitude/longitude coordinates, external search manager 358 determines that the results are duplicates, and eliminates all but one of those results from the result record. When external search manager 358 has compiled the result record, external search manager 358 provides the result record to cache manager 354.

When cache manager 354 receives a result record from external search manager 358, cache manager 354 adds the record to the table in results storage 356 that corresponds to the area in which the target is contained. Cache manager 354 also provides the result record to server search manager 352.

When server search manager 352 receives a result record from cache manager 354, server search manager 352 provides the result record along with the search record, retained as described above, to results segregator 360. When results segregator 360 receives the result record and search record, results segregator 360 determines which results in the result record are most relevant to the search. For instance, results segregator 360 may determine that results corresponding to the search term are more relevant than results corresponding to synonyms. Additionally or alternatively, results segregator 360 may find which results are most relevant to the converted target by comparing the coordinates of results to the coordinates of the converted target in the search record, and/or may employ other techniques for determining the relevance of search results. Results segregator 360 creates a segregated results record consisting of the search term, the converted target, and a predetermined number of the most relevant results, for example the five or ten most relevant results. When results segregator 360 has created the segregated results record, results segregator 360 provides the segregated results record to server search manager 352.

When server search manager 352 receives the segregated results record, server search manager 352 provides the segregated results record to sponsor manager 370. When sponsor manager 370 receives the segregated results record, sponsor manager 370 checks sponsor information storage 372 for sponsor information.

As noted, the search may include RSS feeds specified by the user as to the feed, or the feed and text terms, and in such embodiment, destination/ancillary information receiver 310 receives an identifier of the RSS feed and any text terms, and builds an RSS record containing these items and the identifier of the device containing destination/ancillary information receiver 310. Destination/ancillary information receiver 310 provides the RSS record to search manager 352, which provides it to cache manager 354, which arranges to receive the feed and stores the RSS record into results storage 356. As the feed is received, cache manager 354 stores it into results storage 356 and such results are part of what is searched as described above. When a request is received, it contains the device identifier, and search manager 352 provides the device identifier to cache manager 354. When cache manager 354 searches the results in results storage 356, cache manager 354 will also search the RSS feed or feeds corresponding to that device as indicated by the RSS records for the device. In the event that the information is on a different server, cache manager 354 may search using that server. The results obtained by cache manager will additionally include any such results from RSS feeds. This same approach may be used for non-RSS-formatted data that will reside on another server.

In one embodiment, sponsor information storage 372 includes a conventional database. At any time, a system administrator may use sponsor information provider 374 to update sponsor information storage 372 with sponsor information received from a sponsor (not shown) via communication interface 350. In one embodiment, sponsor information includes a sponsor identifier; a search term or terms corresponding to that sponsor; a relevant location area, which may be defined as the latitude and longitude coordinates that form the boundaries of the relevant location area; an address such as a street address; latitude and longitude coordinates of the sponsor's location, normally corresponding to the address; optionally, an image file such as a JPEG file, or other media file such as a sound or multimedia file, or text, comprising an advertisement for the sponsor; and, also optionally, metadata, such as a description of the sponsor, and/or a description of a follow-up service, for instance, WSDL metadata describing a web service which allows automated ticket sales for a movie theater, or describing an automated reservation service for a restaurant. Contact information such as an e-mail address may optionally be included in the sponsor information as well.

In one embodiment, when sponsor information provider 374 receives such information, sponsor information provider 374 adds a charge location area to the sponsor information before storing it in sponsor information storage 372. The charge location area is based on the sponsor's location but includes a radius of predetermined length, such as four city blocks, around the address. In this embodiment, sponsor information provider 374 includes a conventional Geographic Information System (GIS) database, and uses conventional geocoding techniques to determine the latitude and longitude coordinates defining the boundary of the charge location area. In one embodiment, the latitude and longitude coordinates of the sponsor's location are not received from the sponsor but are added to the sponsor information by sponsor information provider 374 based on the sponsor's address.

When sponsor manager 370 checks sponsor information storage 372 for sponsor information as described above, sponsor manager 370 compares the names and addresses included in the results of the segregated results record with the names and addresses included in the sponsor information. If sponsor manager 370 finds one or more matches, indicating that a sponsor or sponsors are listed among the results, sponsor manager 370 includes an indication that will cause the sponsors' results to be enhanced when the results are displayed, as described below. In one embodiment, sponsor manager 370 additionally appends any advertisement files from the sponsor information to the search results record.

In one embodiment, sponsor manager 370 additionally checks for sponsor information where the search term or terms corresponding to that sponsor match the search term of the segregated results record, and/or where the converted target of the segregated results record is located within the relevant area of the sponsor information. In this embodiment, if sponsor manager 370 finds a match or matches to either or both of the above, sponsor manager 370 appends a new result to the search results record for each match, using the name, address, and latitude and longitude coordinates contained in the matching sponsor information. Sponsor manager 370 may optionally include an enhancement indicator in these results and additionally append any advertisement files from the matching sponsor information to the search results record as described above. In one embodiment, sponsor manager 370 performs these actions only for a limited number of sponsors, for example, sponsor manager 370 may only enhance the results and/or append advertisements for up to three sponsors. In one embodiment, for each result that sponsor manager 370 appends or enhances, sponsor manager 370 adds the charge location area and the sponsor identifier from the matching sponsor information to that result in the search results record. In one embodiment, for each result that sponsor manager 370 appends or enhances, sponsor manager 370 provides the sponsor identifier from the matching sponsor information, optionally along with an indication of whether an advertisement file was appended to the result, to sponsor charge manager 376, for use as described below.

When sponsor manager 370 has modified the search results record, or if sponsor manager 370 determines that no matching sponsor information is stored in sponsor information storage 372, sponsor manager 370 provides the search results record to server search manager 352.

When server search manager 352 receives the search results record from sponsor manager 370, server search manager 352 provides the search results record to device 196 via communication interface 350. Server search manager 352 may discard any previously retained information.

Referring again to FIG. 3, when communications interface 340 of device 196 receives the search results record from server 186, communications interface 340 provides the search results record to device search manager 326. Additionally, communications interface 340 provides the search results record to sponsor tracker 336.

When device search manager 326 receives the search results record, device search manager 326 uses the information in the search results record, and optionally information contained in database 316, to create an informative display for the user which is displayed via touch screen display 312. For example, the results may be displayed in list format, or may be displayed in the form of a map image, or both. Depending on the format of the display, device search manager 326 may use different techniques to enhance the display of any results containing an enhancement indication as described above. For instance, device search manager 326 may place enhanced results near the top of a list, or may cause enhanced results to be highlighted when placed on a map. Display search manager 326 may use other techniques to enhance the display of results in other embodiments. As described above, the information in the search results record used by device search manager 326 to create the display may also include advertisement information in the search results record. Additionally, as described above, the information in the search results record used by device search manager 326 to create the display may include descriptions of follow-up services, for instance, WSDL or other metadata describing a web service which allows automated ticket sales for a movie theater, or describing an automated reservation service for a restaurant. In one embodiment, device search manager 326 provides a user interface as part of the display which allows the user to select any such available follow-up services. If the user does select an available follow-up service, device search manager 326 provides the corresponding follow-up metadata to follow-up manager 332, optionally along with the sponsor identifier and the latitude and longitude coordinates of that result for use as described below.

When follow-up manager 332 receives follow-up metadata and optionally additional information from device search manager 326, follow-up manager 332 provides the follow-up metadata and any received sponsor identifier to server 186 via communication interface 340. In one embodiment, follow-up manager 332 also retrieves a unique device identifier from user storage 314, which may for example be preloaded in user storage 314 when the device is shipped from a factory, and follow-up manager 332 provides this device identifier to server 186 along with the follow-up metadata. Additionally, in one embodiment, follow-up manager 332 provides additional data required by the follow-up service, as indicated in the follow-up metadata. For example, for reservation services that require the user's name, follow-up manager checks user storage 314 to determine whether the user's name is stored there, and if so, retrieves the user's name and provides it to server 186. In this embodiment, if the user's name is not stored in user storage 314, follow-up manager 332 provides a user interface to the user via touch screen display 312, prompting the user to input a name. Follow-up manager 332 then provides the name to server 186 along with the follow-up metadata, stores the user's name in user storage 314, or optionally provides a user interface to the user allowing the user to determine whether such information should be stored and automatically used in the future. Many other types of information, including but not limited to payment information such as credit card information, or user preferences such as smoking or non-smoking, may be collected by follow-up manager 332, stored in user storage 314, and used to automatically initiate follow-up services. In one embodiment, the user may further specify whether follow-up manager 332 should automatically use the given piece of information or should prompt the user for confirmation before each use; in cases of sensitive information such as credit card information, the user may prefer to be prompted and/or to supply a password before use.

Some types of information required by follow-up services may dynamic rather than static, and therefore may not be stored in user storage 314. For example, the reservation service described above may require an arrival time. Follow-up manager 332 may automatically determine some information of this type. For example, to determine the arrival time, follow-up manager 332 may signal location identifier 320. In this embodiment, when signal location identifier 320 receives a signal from follow-up manager 332, signal location identifier 320 determines the current time and the latitude and longitude coordinates of the current location and provides this information to follow-up manager 332. Follow-up manager 332 then provides the latitude and longitude coordinates of the current location, along with the latitude and longitude coordinates of the result which may be received from device search manager 326 as described above, to target converter 328. In this embodiment, when target converter 328 receives such coordinates from follow-up manager 332, target converter 328 provides the coordinates to mapper 318, which determines the time required to traverse the best route from the current location to the result using the information in database 316 as described above, and provides this information to follow-up manager 332. Follow-up manager 332 then determines the arrival time by adding the time required to traverse the route to the current time, and provides this information to server 186 along with the follow-up metadata and any other required information determined as described above. When automatically determining information such as arrival time, follow-up manager 332 may optionally prompt the user for confirmation of the automatically determined information via touch screen display 312, and may allow the user to replace the automatically determined information with manually entered information.

Referring momentarily to FIG. 4, when communication interface 350 of server 186 receives follow-up metadata along with the device identifier, any sponsor identifier, and any additional information required by the follow-up service as described above, communication interface 350 provides this information to follow-up processor 380. When follow-up processor 380 receives follow-up metadata along with the device identifier and additional information, follow-up processor 380 invokes the service on behalf of the device, for example by using one or more SOAP calls to invoke the service described by the metadata via communication interface 350. In the embodiment that a follow-up processor 380 received a sponsor identifier along with the metadata, follow-up processor 380 provides that sponsor identifier along with the device identifier to sponsor charge manager 376, which charges the sponsor for the follow up service as described in more detail below. Follow-up processor 380 also provides a confirmation to device 196 via communication interface 350, or alternatively, if for any reason follow-up processor 380 failed to successfully invoke the service, follow-up processor 380 provides an error message to device 196 via communication interface 350.

Referring again to FIG. 3, when communication interface 340 of device 196 receives a confirmation or an error message, communication interface 340 provides the confirmation or error message to device search manager, which displays the information to the user via touch screen display 312.

As described above, when communications interface 340 receives a search results record from server 186, communications interface 340 provides the search results record to sponsor tracker 336 as well as to device search manager 326. When sponsor tracker 336 receives the search results record, sponsor tracker 336 in one embodiment discards any previously stored information and unsets any previously set timers. Sponsor tracker 336 determines whether any charge location areas are included in the results. If so, sponsor tracker 336 stores in user storage 314 the description of each charge location area, the corresponding sponsor identifier included in the results, and the date and time. Sponsor tracker 336 also sets a timer for a predetermined amount of time, for example, five minutes. When the timer expires, sponsor tracker 336 signals location identifier 320 and resets the timer for another five minutes.

When location identifier 320 receives a signal from sponsor tracker 336, location identifier 320 determines the latitude and longitude coordinates of the current location and provides the coordinates to sponsor tracker 336. Sponsor tracker 336 compares the coordinates received from location identifier 320 to the stored charge location area or areas. If sponsor tracker 336 determines that the current location lies within a charge location area, sponsor tracker 336 provides the sponsor identifier corresponding to that charge location area to server 186 via communication interface 340. In one embodiment, sponsor tracker 336 also retrieves the device identifier from user storage 314, and sponsor tracker 336 provides this device identifier along with any sponsor identifier provided to server 186. In one embodiment, sponsor tracker 336 continues to reset the timer; therefore, sponsor tracker 336 continues to periodically signal location identifier 320 and to compare the current coordinates with the stored charge location areas. If the current time is more than a threshold amount of time, for example three or eight hours, after the time stored in an entry containing such charge location areas, sponsor tracker 336 deletes the entry in user storage 314.

Referring again to FIG. 4, when communication interface 350 of server 186 receives a sponsor identifier from device 196, communication interface 350 provides the sponsor identifier to sponsor charge manager 376.

As described above, sponsor charge manager 376 may receive sponsor identifiers from sponsor manager 370, from follow-up processor 380, or from communication interface 350. Each time sponsor charge manager 376 receives a sponsor identifier, sponsor charge manager 376 internally stores a record of a charge associated with that sponsor identifier, which it retrieves from sponsor information storage 372, such charges being recorded there by a system administrator. In one embodiment, the charges vary depending on the source, which is provided with the sponsor identifier. For example, sponsor charge manager 376 may record a charge of one dollar when a sponsor identifier is received from follow-up processor 380 or from sponsor tracker 336 of device 196, because in these cases it is known that the user either invoked a sponsor's service or else visited a sponsor's location after viewing a sponsor's result. By contrast, sponsor charge manager 376 may only record a charge of fifty cents, or no charge at all, when a sponsor identifier is received from sponsor manager 370, because in this case it is only known that a sponsor's result was displayed to the user, and not known whether the user took any action based on that viewing. As described above, when sponsor charge manager 376 receives a sponsor identifier from sponsor manager 370, the sponsor identifier may optionally be accompanied by an indication that an advertisement file was appended to the result. Sponsor charge manager 376 may optionally record a higher charge when the sponsor identifier is accompanied by such an indication.

Periodically, such as at the end of the day or month, sponsor charge manager 376 compiles a bill for each sponsor by adding the internally stored charges associated with each sponsor identifier, and provides the bills to the sponsors via communication interface 350, for example by retrieving the sponsor's e-mail addresses from sponsor information storage 372. In other embodiments, sponsor charge manager 376 may not provide the bills to the sponsors directly, but may instead provide the bills to a separate billing system not shown.

In one embodiment, searches may include ancillary information. As previously described, ancillary information may be used, for example, to identify in the results a restaurant frequented by a friend of the user. Referring now to FIGS. 3 and 4, in this embodiment, at any time, the user of device 196 may enter the device identifier of a friend via touch screen display 312. When the user enters such information, destination/ancillary information receiver 310 receives the device identifier and stores it in user storage 314 as a friend identifier.

The user may also enter schedule information at any time via touch screen display 312, and destination/ancillary information receiver 310 similarly receives this information and stores it in user storage 314.

As described above, when server 186 receives a sponsor identifier from follow up manager 332 or from sponsor tracker 336 of device 196, the sponsor identifier may be received along with the device identifier of device 196. In this embodiment, when sponsor charge manager 376 of server 186 receives a sponsor identifier along with a device identifier, either from communication interface 350 or from follow-up processor 380, sponsor charge manager 376 adds that sponsor identifier to a record of that device. identifier in a preference database stored in sponsor information storage 372. When similar information is received from other devices, such as the device of the user's friend, sponsor charge manager 376 acts in the same fashion to store-that information in the preference database in sponsor information storage 372. In this fashion, a database of the locations and services frequented by each user of the system is built and maintained. In this embodiment, when device search manager 326 prepares a search record as described above, instead of providing the search record to server 186, device search manager 326 instead provides the record to ancillary information search manager 330, and ancillary information search manager 330 checks user storage 314 to determine whether any ancillary information relevant to the search, such as friend or schedule information, is stored in user storage 314. If such ancillary information is found, ancillary information search manager 330 appends the ancillary information to the'search record along with the device identifier and returns it to device search manager 326, which proceeds to provide the search record to server 186 as described above.

Furthermore, in this embodiment, when server search manager 352 provides the segregated results record to sponsor manager 370 as described above, server search manager 352 also provides the any ancillary information from the search record, including the device identifier, along with the segregated results record. Sponsor manager 370 adds the ancillary information to a record of that device identifier in preference storage 382, which in one embodiment includes a conventional database. In this embodiment, when sponsor manager 370 has appended results to or enhanced results in the segregated results record based on sponsor information as described above, sponsor manager 370 also checks the records in preference storage 382 of any device identifiers provided as friend identifiers in the ancillary information. If any sponsor identifiers are stored in these records, sponsor manager 370 compares the sponsor identifiers to the segregated results record. For example, sponsor manager 370 may determine that one of the results in the segregated results record is associated with a sponsor identifier which also appears in the preference record associated with a friend of the user. Sponsor manager 370 may then add an indication to that result which will cause it to be displayed as a "friend favorite" when that result is displayed to the user. The example of a sponsored result that is a "friend favorite" is described as a representative example, but more information may be collected and maintained in a manner at least similar to that described herein, in order to allow server 186 to identify non-sponsored results as well as sponsored results as "friend favorites", or to identify results with other useful information based on the activities of the user and the user's friends.

Automatic searches are performed as described above, with automatic search user interface manager 350 providing a user interface via touch screen display 312 and receiving the one or more search terms, which may be entered or selected as described above. Automatic search user interface manager 350 provides the terms to automatic search execution manager 352, which stores the one or search terms received from automatic search user interface manager 350, and internally stores any such terms. Automatic search execution identifier 352 requests and receives the current date and time and/or location from location identifier 320 and compares the date and time or location or both to any stored date and/or time it maintains as described below. If the date and time and/or location are different from such stored date and time and/or location by at least a threshold amount, automatic search execution manager 352 stores the date and time, location or both and provides to device search manager 326 the search term or terms it received from automatic search user interface manager 350 in the manner or manners described above and an indication that the search is to be performed using the current location as the target location. Device search manager 326 then initiates the search in the manner described above.

What is claimed is:

1. A method of providing results corresponding to at least one search term and a target location, the method comprising:
    receiving, and associating an identifier of a Really Simple Syndication (RSS) feed with at least one device;
    storing, in a cache of one or more servers, the identifier of the RSS feed, the RSS feed and an identifier for each device associated with the RSS feed;
    receiving, via a network from a device, a request comprising the at least one search term and the target location;
    identifying whether a threshold number, greater than one, of a plurality of search results corresponding to the at least one search term and the target location exist in the cache with at least one search result in the cache being from a RSS feed corresponding to the device from which the request was received, wherein the device is identified by the identifier for the device associated with the RSS feed;
    responsive to the threshold number of the plurality of search results corresponding to the at least one search term and the target location existing in the cache:
        selecting a proper subset of the plurality of search results, which more closely corresponds to the target location than the remainder of search results not selected,
        modifying the proper-subset of the plurality of search results responsive to at least one sponsor who has paid a fee for the sponsorship, and
        providing the modified proper subset of the plurality of search results to the device from which the request was received; and
    responsive to the threshold number of search results corresponding to the at least one search term and the target location not existing in the cache, providing one or more search results from the RSS feed to the device.

2. The method of claim 1, additionally comprising, responsive to the threshold number of search results corresponding to the at least one search term and the target location not existing in the cache:
    providing the at least one search term to at least one external server;
    receiving a plurality of search results to the at least one search term provided to the at least one external server; and
    storing in the cache at least some of the plurality of search results received.

3. The method of claim 2, wherein the at least one external server comprises a plurality of external servers, each operated by an entity independent of operators of the other external servers.

4. The method of claim 1, additionally comprising:
receiving information useful for performing a follow up operation with at least one of the at least one sponsor; and
performing the follow up operation with the at least one of the at least one sponsor responsive to the information received.

5. The method of claim 4, wherein the performing the follow up operation comprises contacting at least one of the at least one sponsor or an agent of at least one of the at least one sponsor.

6. The method of claim 1, additionally comprising:
receiving an indication that the device is nearby a location of the at least one of the at least one sponsor; and
charging said at least one of the at least one sponsor a fee responsive to the indication.

7. The method of claim 1:
wherein the request comprises ancillary information comprising at least one selected from the group comprising schedule information regarding a user of the device from which the request was received and at least one identifier of another device; and
the method additionally comprises modifying the proper subset of the plurality of search results responsive to the ancillary information.

8. A system for providing results corresponding to at least one search term and a target location, the system comprising:
a search manager having an input operatively coupled for receiving, via a network from a device, a request comprising the at least one search term and the target location, the search manager for providing the request at an output;
a cache manager having an input coupled to the search manager output for receiving the request, the cache manager for identifying whether a threshold number, greater than one, of search results corresponding to the at least one search term and the target location exist in a cache of one or more servers, the cache comprising an identifier of a Really Simple Syndication (RSS) feed associated with at least one device, the RSS feed and an identifier for each device associated with the RSS feed, the cache coupled to the cache manager via an input/output and for, responsive to the threshold number of search results corresponding to the at least one search term and the target location existing in the cache, providing a plurality of said search results and at least a portion of the request, comprising the target location, at an output wherein at least one search result in the cache is from a RSS feed corresponding to the device from which the request was received, wherein the device is identified by the identifier for the device associated with the RSS feed;
a results segregator having an input coupled to the cache manager output for receiving the plurality of search results, the results segregator for selecting a proper subset of the plurality of search results more closely corresponding to the target location in the request than the remainder of search results not selected and for providing the proper subset at an output;
a sponsor manager having an input coupled to the results segregator output for receiving the subset, the sponsor manager for modifying the subset of the plurality of search results responsive to at least one sponsor who has paid a fee for the sponsorship and for providing at an output the modified subset of the plurality of search results; and
a communication interface having an input coupled to the sponsor manager output for receiving the modified proper subset of the plurality of search results, the communication interface for providing via an output the modified proper subset of the plurality of search results to the device from which the request was received.

9. The system of claim 8:
wherein the cache manager is additionally for, responsive to the threshold number of search results corresponding to the at least one search term and the target location not existing in the cache, providing at, the cache manager output the at least one search term; and
additionally comprising an external search manager having an input coupled to the cache manager output for receiving the at least one search term, the cache manager for providing at an input/output the at least one search term to at least one external server, receiving at the cache manager input/output a plurality of search results to the at least one search term provided to the at least one external server, and for storing in the cache via an input/output coupled to the cache at least some of the plurality of search results received.

10. The system of claim 9, wherein the at least one external server comprises a plurality of external servers, each operated by an entity independent of operators of the other external servers.

11. The system of claim 8, additionally comprising a follow up processor having an input for receiving information useful for performing a follow up operation with at least one of the at least one sponsor, the follow up processor for performing the follow up operation with the at least one of the at least one sponsor responsive to the information received.

12. The system of claim 11, wherein the follow up operation comprises contacting the at least one of the at least one sponsor or an agent of the at least one sponsor.

13. The system of claim 8, additionally comprising a sponsor charge manager having an input for receiving an indication that the device is nearby a location of at least one of the at least one sponsor, the sponsor charge manager for charging via an output the at least one of the at least one sponsor a fee responsive to the indication.

14. The system of claim 8 wherein:
the request comprises ancillary information comprising at least one selected from the group comprising schedule information regarding a user of the device from which the request was received and at least one identifier of another device;
the results segregator provides the ancillary information at the results segregator output;
the sponsor manager input is additionally for receiving the ancillary information; and
the sponsor manager is additionally for modifying the proper subset of the plurality of search results responsive to the ancillary information.

15. A computer program product comprising a tangible non-transitory computer useable medium having computer readable program code embodied therein for providing search results corresponding to at least one search term and a target location, the computer program product comprising computer readable program code devices configured to cause a computer system to:
receive and associate an identifier of a Really Simple Syndication (RSS) feed with at least one device;

store, in a cache of one or more servers, the identifier of the RSS feed, the RSS feed and an identifier for each device associated with the RSS feed;

receive, via a network from a device, a request comprising the at least one search term and the target location;

identify whether a threshold number, greater than one, of a plurality of search results corresponding to the at least one search term and the target location exist in the cache wherein at least one result in the cache is from a RSS feed corresponding to the device from which the request originated, wherein the device is identified by the identifier for the device associated with the RSS feed; and responsive to the threshold number of the plurality of search results corresponding to the at least one search term and the target location existing in the cache:
   select a proper subset of the plurality of search results more closely corresponding to the target location than the remainder of search results not selected;
   modify the subset of the plurality of search results responsive to at least one sponsor who has paid a fee for the sponsorship; and
   provide the modified proper subset of the plurality of search results to a device from which the request was received.

16. The computer program product of claim 15, additionally comprising, computer readable program code devices configured to cause the computer system to, responsive to the threshold number of search results corresponding to the at least one search term and the target location not existing in the cache:
   provide the at least one search term to at least one external server;
   receive a plurality of search results to the at least one search term provided to the at least one external server; and
   store in the cache at least some of the plurality of search results received.

17. The computer program product of claim 16 wherein the at least one external server comprises a plurality of external servers, each operated by an entity independent of operators of the other external servers.

18. The computer program product of claim 15, additionally comprising computer readable program code devices configured to cause the computer system to:
   receive information useful for performing a follow up operation with at least one of the at least one sponsor; and
   perform the follow up operation with the at least one of the at least one sponsor responsive to the information received.

19. The computer program product of claim 18, wherein the computer readable program code devices configured to cause the computer system to perform the follow up operation comprise computer readable program code devices configured to cause the computer system to contact at least one of the at least one sponsor or an agent of at least one of the at least one sponsor.

20. The computer program product of claim 15, additionally comprising computer readable program code devices configured to cause the computer system to:
   receive an indication that the device is nearby a location of at least one of the at least one sponsor; and
   charge said at least one of the at least one sponsor a fee responsive to the indication.

21. The computer program product of claim 15:
   wherein the request comprises ancillary information comprising a selection from the group comprising schedule information regarding a user of the device from which the request was received and at least one identifier of another device; and
   additionally comprising computer readable program code configured to cause the computer system to modify the proper subset of the plurality of search results responsive to the ancillary information.

* * * * *